US006532086B1

(12) United States Patent
Tallie

(10) Patent No.: US 6,532,086 B1
(45) Date of Patent: Mar. 11, 2003

(54) OPTICAL COLOR MATRIXING USING TIME DELAY AND INTEGRATION SENSOR ARRAYS

(75) Inventor: Joseph Paul Tallie, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/443,136

(22) Filed: Nov. 19, 1999

(51) Int. Cl.$^7$ ................................................. H04N 1/46
(52) U.S. Cl. ........................ 358/512; 358/509; 358/515
(58) Field of Search ................................. 358/512, 514, 358/513, 483, 482, 515, 509; 250/208.1

(56) References Cited

U.S. PATENT DOCUMENTS

| | | | | |
|---|---|---|---|---|
| 4,985,760 A | * | 1/1991 | Maeshima et al. | 358/514 |
| 4,994,907 A | * | 2/1991 | Allen | 358/512 |
| 5,055,921 A | * | 10/1991 | Usui | 358/514 |
| 5,773,814 A | * | 6/1998 | Phillips et al. | 250/208.1 |
| 6,195,183 B1 | * | 2/2001 | Fujimoto et al. | 358/514 |

* cited by examiner

Primary Examiner—Cheukfan Lee
(74) Attorney, Agent, or Firm—Oliff & Berridge, PLC

(57) ABSTRACT

In the known time delay and integration (TDI) color scanner, a different color filter covers each group m of N rows. The spectral sensitivity of each group m of N rows can be improved if some of the photosites in one group are covered by filters from other groups. The TDI color scanner produces a first set of device dependent color signals which may be transformed into a corresponding set of color signals, which may approximate device independent color signals, using a transformation matrix. Typical TDI scanners include photosites arranged in rows divided into groups of rows, and a color filter is associated with each group. However, in the inventive TDI color scanner, each color filter covers more or less than the rows in its corresponding group and some or none of the rows in other groups. The color filters therefore produce a second set of color signals that are linear combinations of the first set of device dependent color signals and are based on a number of rows of each group covered by each filter. The second set of color signals may be an approximation of the device independent color signals. Using combinations of different filter materials in different groups provides improvement in color quality over other methods of color scanning.

12 Claims, 4 Drawing Sheets

OPTICAL COLOR MATRIXING USING TIME DELAY AND INTEGRATION SENSOR ARRAYS

BACKGROUND OF THE INVENTION

1. Field of Invention

The invention relates to optical color matrixing using time delay and integration sensors to perform a color matrix operation that provides an improvement in color quality.

2. Description of Related Art

In most color document scanners, some form of electro-optical imaging system is used to produce a set of color image signals. Often, there are three such signals that can generally be described as red, green and blue, RGB. These signals are "device dependent" because they depend on characteristics of the scanner.

If these signals are related to the human visual system in a certain way, the device dependent signals can be processed to produce a set of signals which are "device independent". That is, the three color image signals produced by the scanner can be expressed by three color scanner coordinates RGB, to which a transformation can be applied to describe the three scanner coordinates in terms of three visual coordinates XYZ. As used herein, these visual coordinates are tristimulus values or similar coordinates related to tristimulus values. The visual coordinates can be transmitted to an output device such as a printer, copier or display screen to output an image that corresponds to the scanned image. Because the visual coordinates are device independent, they can be transmitted to different copiers, printers or display screens, and generally the same image will be output regardless of the characteristics of the scanner, copier, printer or display screen.

The ideal transformation between RGB and XYZ coordinates is a linear matrix operation shown in equations 1–3:

$$X = k_1 * R + k_2 * G + k_3 * B \qquad \text{Eq. 1}$$

$$Y = k_4 * R + k_5 * G + k_6 * B \qquad \text{Eq. 2}$$

$$Z = k_7 * R + k_8 * G - k_9 * B \qquad \text{Eq. 3}$$

A more compact expression is given by the matrix equation $$v = Ks. \qquad \text{Eq. 3A}$$

where v and s are column vectors of the visual and scanner coordinates, respectively, and K is a transformation matrix made up of $k_n$ coefficients.

It is common to try to design the scanner so that these equations are at least approximately true. In addition, it is known to determine the $k_n$ coefficients by procedures in such a way that the equations are satisfied as close as possible. Optimization schemes have been designed to try to minimize the color errors of scanned inputs by appropriate selection of the coefficients $k_n$ in the transformation matrix K.

A time delay and integration (TDI) color scanner (FIG. 3) is an electronic color scanner that uses a sensor having N rows or stages of photosites or pixels replicated in each of M groups of the N rows. For example, TDI sensors are known in which 96 stages are provided (N=96) in three groups (M=3). Each group of N rows is covered with a color filter. When M=3, the color filters are often red, green and blue. It is possible to improve the performance of the scanner by increasing the number of groups and corresponding filters beyond three to correct for the fact that the filters are not ideal (i.e., they do not satisfy Equations 1–3). By adding filters that are independent of the red, green and blue filters, and by modifying the transformation equations accordingly, it is thought that a better approximation to the visual coordinates XYZ values can be obtained.

In the TDI scanner, the N rows of photosites are scanned synchronously to make the apparent dwell time of each spot on the input document N times longer than for a single row. In a TDI system, the total signal from a series of stages of single color groups is given by:

$$S_m = \tau \Sigma_{n=1 \ldots N} [H_{nm} r_m O_m f_m R_{nm}] \qquad \text{Eq. 4}$$

where $\tau$ is the integration time,

N is the number of stages, $H_{nm}$ is the m-color irradiance at the position corresponding to the nth stage, $r_m$ is the m-color reflectance at the point of interest, $O_m$ is the m-color throughput of the optical system, $f_m$ is the m-color filter transmittance, and $R_{nm}$ is the responsivity of the m-color sensor in the nth stage.

If the illumination and responsivity are assumed to be constant over space and time, the signal is $$S_m = N \tau H_m r_m O_m f_m R_m \qquad \text{Eq. 5}$$

For example, the "red" signal R is given by the sum over all stages in the "red" group as follows:

$$R = N \tau H_r r_r O_r f_r R_r \qquad \text{Eq. 5A}$$

SUMMARY OF THE INVENTION

In the known TDI scanner, a different color filter covers each group m of N rows. The effective spectral sensitivity of each group m of N rows can be improved if some of the photosites in one group are covered by filters from other groups.

To achieve this and other objects, the invention relates to a time delay and integration color scanner for producing a first set of device dependent color signals that may be transformed into a corresponding set of device independent color signals using a transformation matrix. The scanner includes photosites arranged in rows and divided into groups of the rows; and a color filter associated with each group. Each color filter covers more or less than the rows in its corresponding group and some or none of the rows in other groups. The color filters produce a second set of color signals that are linear combinations of the first set of device dependent color signals and are based on a number of rows of each group that are covered by each filter. The second set of color signals may be an approximation to the device independent color signals.

BRIEF DESCRIPTION OF THE DRAWINGS

Exemplary embodiments of the invention will be described with reference to the following drawings in which.

DETAILED DESCRIPTION OF EXEMPLARY EMBODIMENTS

Figure 1:
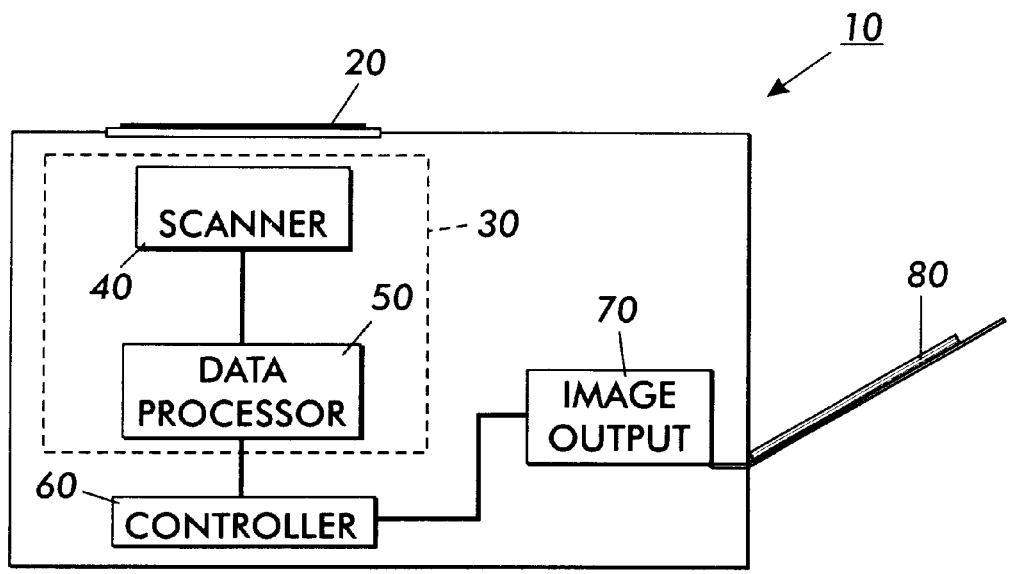
FIG. 1 is a schematic diagram of a color copier in which the invention may be embodied.

FIG. 1 is a highly schematic drawing of a color copier 10 in which the invention may be embodied. The copier 10 is used to image a color document 20 and output a color image on paper or another substrate based on the document image. The copier 10 has an imaging device 30 that includes a scanner 40 and a data processor 50 for sensing the image on the document 20 and outputting signals representing the color image to a controller 60. Based on these signals, the controller 60 controls an image output device 70 to create a color copy 80.

Although the invention is described with reference to a color copier, those skilled in the art recognize that the invention has broader applications to any imaging system. For example, while the imaging device is shown incorporated into a copier, the imaging device could be a stand alone device, such as a hand-held scanner, or incorporated into a larger imaging system such as a scanner, digital camera or personal computer, or an assembly of such devices. Likewise, although the imaging device is shown as including a data processor, the data processing function could be performed by other elements in the controller and/or scanner. Thus, the data processor could be eliminated as a separate component. Further, the data processor and controller can perform any image processing function that can be performed on image data.

Figure 2:
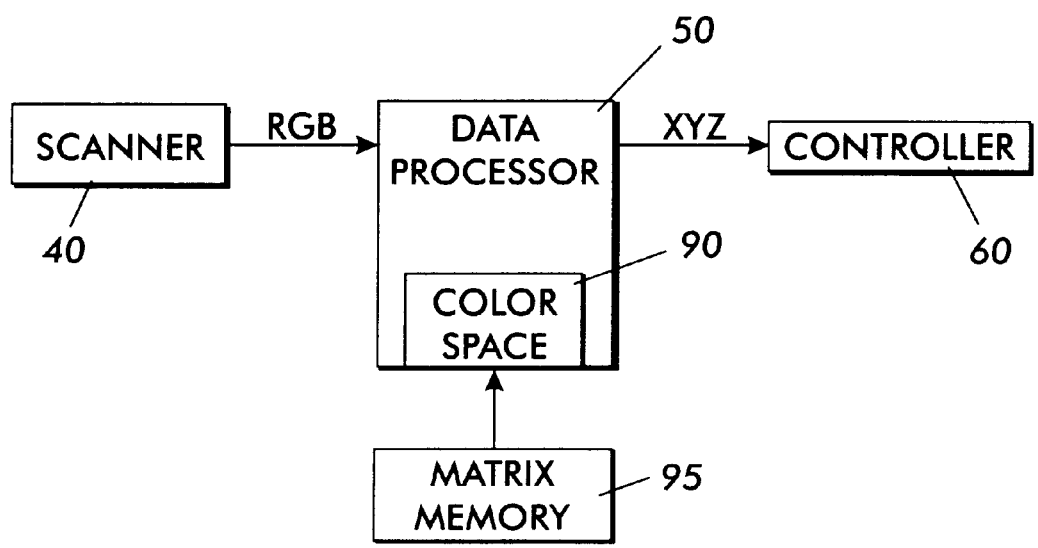
FIG. 2 is a schematic illustration of the operation of an imaging device within the color copier.

FIG. 2 schematically illustrates the operation of the imaging device. An original color document is scanned by the scanner 40, which outputs the scanner RGB values to the data processor 50. A color space transformation module 90, located within the data processor 50, transforms the RGB values using the transformation matrix K to generate the XYZ values, which are input into the controller 60 for operating the image output device 70 to generate the color copy. The module 90 receives the transformation matrix K from a memory 95.

Figure 3:
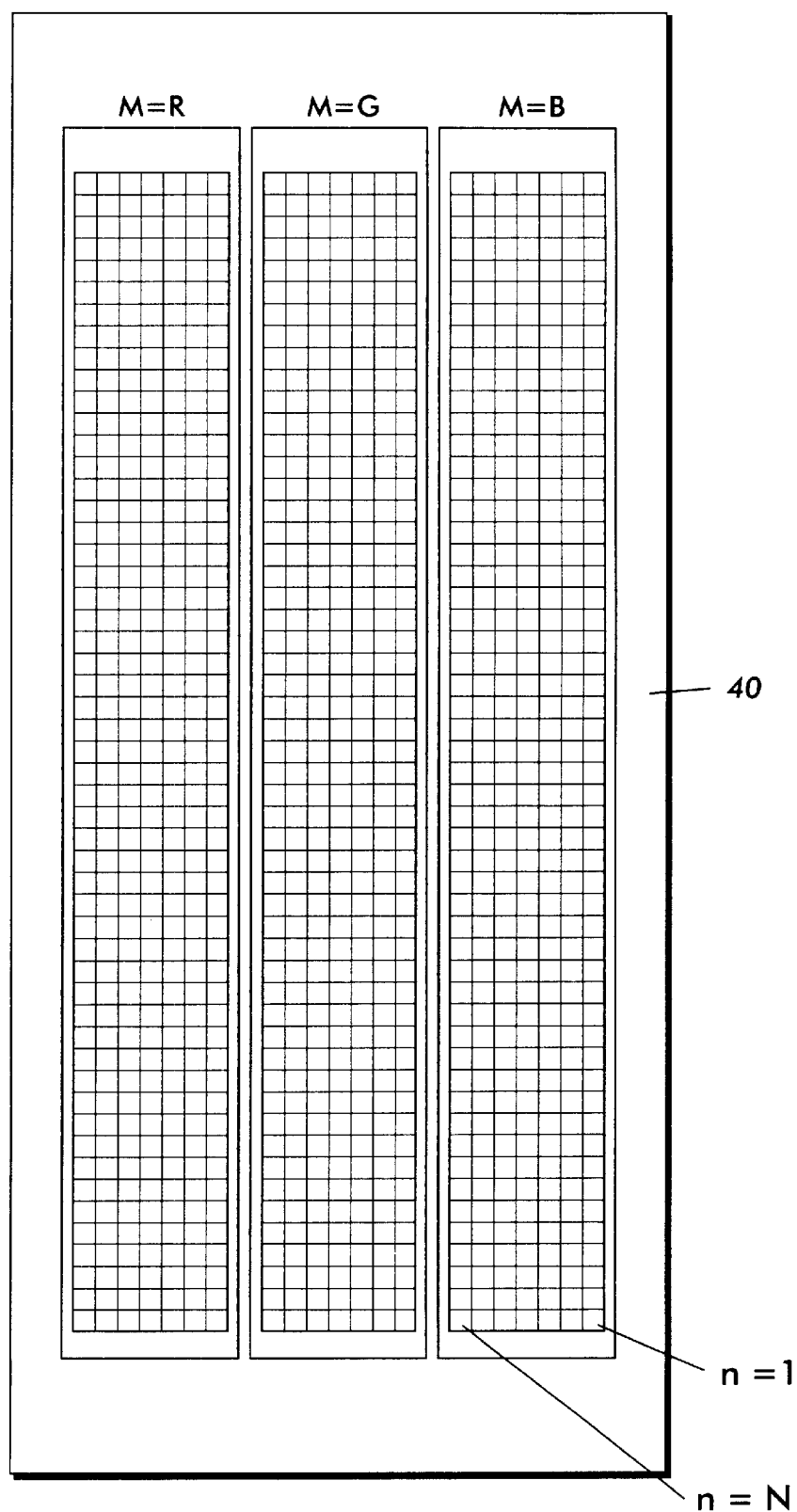
FIG. 3 is a schematic top view of a time delay and integration color sensor showing N rows of photosites divided into M groups of rows.
Figure 4:
FIG. 4 is a front view of the time delay and integration sensor of FIG. 3.

The scanner 40 of FIG. 2 is a time delay and integration (TDI) color scanner. FIGS. 3 and 4 show conventional arrangements of a TDI color sensor using three color filters, RGB. Each of the three groups m of N stages is covered by a discrete filter R, G or B to form the red group, the green group, and the blue group. The signal from each group can be used in equations 1–3 to calculate the XYZ values.

Figure 5:
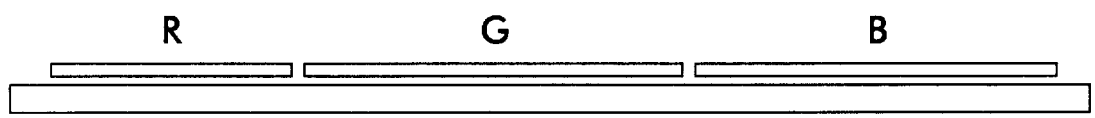
FIG. 5 is a time delay and integration color sensor in accordance with an exemplary embodiment of the invention in which filters are extended to cover two adjacent groups of sensors.

In FIG. 5, the three filters are arranged to cover more or less of the rows in each group of rows, in accordance with one exemplary embodiment of the invention. For example, in FIG. 5, the blue filter B covers all the rows in its group, plus a row in the green group. The green filter G covers all except one of the rows in its corresponding group, plus three rows in the red group. The red filter R covers less than all the rows in its group. The three filters produce signals R', G' and B' that are linear combinations of the R, G and B signals.

Therefore, by allowing the filters to cover varying numbers of stages in each of the groups of TDI rows, it is possible to produce signals that are linear combinations of the signals from the individual filters themselves. For the example illustrated in FIG. 5, the signals are calculated in accordance with the following equations:

$$R'=(N_{RR}/N)R+(N_{RG}/N)G \qquad \text{Eq. 6}$$

$$G'=(N_{GG}/N)G+(N_{GB}/N)B \qquad \text{Eq. 7}$$

$$B'=(N_{BB}/N)B \qquad \text{Eq. 8}$$

Here, $N_{XY}$ is the number of rows of the X sensing group of rows covered by the Y-colored filter. For example, in FIG. 5, $N_{RR}$ equals 12 because the red filter R covers 12 of the 16 rows in the red sensing group. In addition, N is the number of rows in any one group, and the number of rows in any one group may differ from the number of rows in another group.

Figure 6:
FIG. 6 is a time delay and integration color sensor in accordance with another exemplary embodiment of the invention in which three filters are applied to each group.

As shown in FIG. 5, the signals include contributions only from adjacent colors. While simple to produce, this arrangement may not give the flexibility needed to perform the desired transformation. In FIG. 6, each of the groups of rows is covered by by sections of all three filters, extending the matrix to include contributions from all three colors. Now the transformation equations become:

$$R'=(N_{RR}/N)R+(N_{RG}/N)G+(N_{RB}/N)B \qquad \text{Eq. 9}$$

$$G'=(N_{GG}/N)G+(N_{GB}/N)B+(N_{GB}/N)B \qquad \text{Eq. 10}$$

$$B'=(N_{BB}/N)B+(N_{BG}/N)G+(N_{BB}/N)B \qquad \text{Eq. 11}$$

Equations 9–11 could be the matrix transformation given by Equations 1–3. For example, once the values R', G' and B' are determined by Equations 9–11, the R', G' and B' values could be multiplied by a transformation matrix K to obtain the XYZ values. Alternatively, the array of the $N_{XY}/N$ coefficients could be used as the transformation matrix K, such that the values R', G' and B' approximate the values X, Y and Z. The ability to choose the matrix coefficients is limited only by the choices for the $N_{XY}$. In one sense, this is not a serious limitation because the number of rows N can be as high as 96 for example, giving the ability to choose values for the coefficients to about the 1% level of precision.

Figure 7:
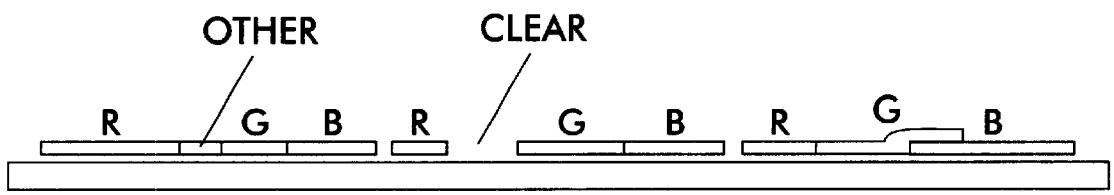
FIG. 7 is a time delay and integration color sensor in accordance with a further exemplary embodiment of the invention in which additional filters are applied to each group so that additive and multiplicative combinations are produced.

The concept described above can be extended to include additional filters. That is, each of the R', G' and B' signals can be composed of four or more terms, each term corresponding to a unique filter. One approach is to add more filters with different spectral transmittances. This is shown on the left side of FIG. 7, where the "red" group is comprised of a combination of red, green, blue and "other" filters. In addition, two special cases that may be useful are shown in FIG. 7. Here the "green" group (in the center of FIG. 7) uses a combination of the three color filters and an unfiltered or clear area. The "blue" group, on the right side of FIG. 7, has a region of overlap between green and blue filters, giving a fourth contribution to the signal that is controlled by the product of the two filters.

If the "other" filter, the unfiltered area or the overlapped green and blue filters, are denoted as the "L" filter, then Equations 9–11 can be reformatted to include the additional term:

$$R'=(N_{RR}/N)R+(N_{RG}/N)G+(N_{RB}/N)B+(N_{RL}/N)L \qquad \text{Eq. 9A}$$

$$G'=(NGG/N)G+(N_{GB}/N)B+(N_{GB}/N)B+(N_{GL}/N)L \qquad \text{Eq. 10A}$$

$$B'=(N_{BB}/N)B+(NBG/N)G+(N_{BB}/N)B+(N_{BL}/N)L \qquad \text{Eq. 11A}$$

As a special case of the configuration shown in FIG. 7, the "other" filter could be a black layer. In this way, the balance between the three color signals can be adjusted using a standard chip configuration.

The extension to additional filters may be broadened. So far, it has been implied that the filters used in each of the three sensing regions were common. In fact, each could be entirely unique. That is, the R' signal may use a red filter having different spectral properties from another "red" filter used in the G' sensor area.

While this invention has been described in conjunction with specific embodiments outlined above, it is evident that many alternatives, modifications and variations will be apparent to those skilled in the art. Accordingly, the preferred embodiments of the invention as set forth above, are intended to be illustrative and not limiting. Various changes may be made without departing from the spirit and scope of the invention as defined herein.

What is claimed is:

1. A time delay and integration color scanner for producing a first set of device dependent color signals that may be transformed into a corresponding set of device independent color signals using a transformation matrix, the scanner comprising:

photosites arranged in rows and divided into groups of the rows;

a color filter associated with each group, each color filter covering more or less than the rows in its corresponding group and some or none of the rows in other groups, the color filters producing a second set of color signals that are linear combinations of the first set of device dependent color signals and are based on a number of rows of each group that are covered by each filter.

2. The time delay and integration color scanner of claim 1, wherein each color filter covers more or less than the rows in its corresponding group and some or none of the rows in an adjacent group.

3. The time delay and integration color scanner of claim 1, wherein the color filter associated with at least one group includes multiple filter sections.

4. The time delay and integration color scanner of claim 3, wherein the color filter associated with at least one group includes at least three filter sections.

5. The time delay and integration color scanner of claim 4, wherein the color filter associated with each group includes at least three filter sections.

6. The time delay and integration color scanner of claim 3, wherein the filter sections in one group include red, green and blue filter sections.

7. The time delay and integration color scanner of claim 3, wherein the filter sections in one group have spectral properties that are the same as the filter sections in the other groups.

8. The time delay and integration color scanner of claim 3, wherein the filter sections in one group have spectral properties that are different from the filter sections in at least one of the other groups.

9. The time delay and integration color scanner of claim 3, wherein any filter section in one group is unique relative to other filter sections in that group.

10. The time delay and integration color scanner of claim 3, wherein the filter section in one group includes an unfiltered section.

11. The time delay and integration color scanner of claim 3, wherein the filter section in one group includes overlapped filter sections.

12. The time delay and integration color scanner of claim 3, wherein the filter section in one group includes a black filter section.

* * * * *